(12) United States Patent
Lin et al.

(10) Patent No.: US 7,811,441 B2
(45) Date of Patent: Oct. 12, 2010

(54) ORGANIC PHOTOSENSITIVE PIGMENT

(75) Inventors: Liang-bih Lin, Rochester, NY (US);
William Herbert, Williamson, NY (US);
Jin Wu, Webster, NY (US); Daniel Levy, Rochester, NY (US); Francisco Lopez, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1056 days.

(21) Appl. No.: 11/524,748

(22) Filed: Sep. 21, 2006

(65) Prior Publication Data

US 2008/0076916 A1    Mar. 27, 2008

(51) Int. Cl.
*C25B 3/00* (2006.01)

(52) U.S. Cl. ........................ 205/424; 205/426
(58) Field of Classification Search .......... 205/424, 205/426
See application file for complete search history.

(56) References Cited

U.S. PATENT DOCUMENTS

| 3,121,006 | A | 2/1964 | Middleton et al. |
| 4,298,697 | A | 11/1981 | Baczek et al. |
| 4,338,390 | A | 7/1982 | Lu |
| 4,464,450 | A | 8/1984 | Teuscher |
| 4,560,635 | A | 12/1985 | Hoffend et al. |
| 4,921,773 | A | 5/1990 | Melnyk et al. |

FOREIGN PATENT DOCUMENTS

SU     1153536 A1 * 10/1985

OTHER PUBLICATIONS

Yang et al., "Electrosynthesis of the Metal Phthalocyanine Complexes", Inorg. Chem. (no month, 1980), vol. 19, pp. 3541-3543.*
Kharisov et al., "Electrosynthesis of Phthalocyanines: Influence of Solvent", Ind. Eng. Chem. Res. (no month, 1999), vol. 38, pp. 2880-2887.*
Langdon et al., "A General Utility Laboratory Distillation Column", Ind. Eng. Chem. Anal. Ed. (no month, 1944), vol. 16, No. 10, pp. 639-640.*

* cited by examiner

*Primary Examiner*—Edna Wong
(74) *Attorney, Agent, or Firm*—Pillsbury Winthrop Shaw Pittman LLP

(57) ABSTRACT

Processes for making organic photosensitive pigments for charge generating layers of imaging members. The pigments may include titanyl phthalocyanine. The pigments may be synthesized through a partially electrochemical or purely electrochemical process. The pigments may be used in a charge generating layer of an imaging member having a substrate, the charge generating layer, and a charge transfer layer.

19 Claims, 3 Drawing Sheets

ORGANIC PHOTOSENSITIVE PIGMENT

TECHNICAL FIELD

The present disclosure relates generally to organic photosensitive pigments used in imaging members, such as layered photoreceptor devices, and novel processes for producing the pigments. The imaging members can be used in electrophotographic, electrostatographic, xerographic and like devices, including printers, copiers, scanners, facsimiles, and including digital, image-on-image, and like devices. More specifically, the present embodiments relate to processes for producing titanyl phthalocyanine (TiOPC) electrochemically that provide more control and better yield at lower temperatures.

BACKGROUND

Electrophotographic imaging members, e.g., photoreceptors, typically include a photoconductive layer formed on an electrically conductive substrate. The photoconductive layer is an insulator in the substantial absence of light so that electric charges are retained on its surface. Upon exposure to light, charge is generated by the photoactive pigment, and under applied field charge moves through the photoreceptor and the charge is dissipated.

In electrophotography, also known as xerography, electrophotographic imaging or electrostatographic imaging, the surface of an electrophotographic plate, drum, belt or the like (imaging member or photoreceptor) containing a photoconductive insulating layer on a conductive layer is first uniformly electrostatically charged. The imaging member is then exposed to a pattern of activating electromagnetic radiation, such as light. Charge generated by the photoactive pigment move under the force of the applied field. The movement of the charge through the photoreceptor selectively dissipates the charge on the illuminated areas of the photoconductive insulating layer while leaving behind an electrostatic latent image. This electrostatic latent image may then be developed to form a visible image by depositing oppositely charged particles on the surface of the photoconductive insulating layer. The resulting visible image may then be transferred from the imaging member directly or indirectly (such as by a transfer or other member) to a print substrate, such as transparency or paper. The imaging process may be repeated many times with reusable imaging members.

An electrophotographic imaging member may be provided in a number of forms. For example, the imaging member may be a homogeneous layer of a single material such as vitreous selenium or it may be a composite layer containing a photoconductor and another material. In addition, the imaging member may be layered. These layers can be in any order, and sometimes can be combined in a single or mixed layer.

Typical multilayered photoreceptors have at least two layers, and may include a substrate, a conductive layer, an optional charge blocking layer, an optional adhesive layer, a photogenerating layer (sometimes referred to as, and used herein interchangeably, a "charge generation layer," "charge generating layer," or "charge generator layer"), a charge transport layer, an optional overcoating layer and, in some belt embodiments, an anticurl backing layer. In the multilayer configuration, the active layers of the photoreceptor are the charge generating layer (CGL) and the charge transport layer (CTL). Enhancement of charge transport across these layers provides better photoreceptor performance.

As more advanced, higher speed electrophotographic copiers, duplicators and printers were developed, however, degradation of image quality was encountered during extended cycling. The complex, highly sophisticated duplicating and printing systems operating at very high speeds have placed stringent requirements, including narrow operating limits, on the imaging members.

Organic photosensitive pigments are incorporated in CGLs to improve charge generation and charge transport properties. One such pigment used in the CGL in electrophotographic devices is titanyl phthalocyanines (TiOPC). TiOPC offers many attractive features that includes nontoxicity, relatively low cost, low pollution, broad spectral response ranging from visible to infrared light, and flexible choice for use. Stringent requirements are imposed on the photoconductive as well as mechanical properties of electrophotographic photoreceptors, and thus, photoreceptor materials are required to exhibit, not only efficient charge generation and charge transport properties, but also structural integrity and robustness so as to withstand mechanical abrasion during image development cycles. TiOPC is especially of interest because of its high efficiency of charge generation. Thus, there is provided herein, novel processes that can more efficiently yield TiOPC at lower temperatures and that provide more control of the resulting TiOPC particles.

The term "electrostatographic" is generally used interchangeably with the term "electrophotographic." In addition, the terms "charge blocking layer" and "blocking layer" are generally used interchangeably with the phrase "undercoat layer."

BRIEF SUMMARY

According to embodiments illustrated herein, there is provided a pigment for a charge generating layer that addresses the shortcomings discussed above.

In one embodiment, there is provided a process for making a photosensitive pigment, comprising dissolving one or more starting materials of phthalocyanine in a solvent to form a solution, transferring the solution to an electrochemical cell having two or more electrodes, and applying a voltage bias across the two or more electrodes to form a pigment. The starting materials include a derivative of phthalic acid, a derivative of metal, a derivative of metal salt, or a derivative of organometallic compounds.

In another embodiment, there is provided a process for making a photosensitive pigment, comprising dissolving a first starting material of phthalocyanine and a second starting material of phthalocyanine in a solvent to form a solution, wherein the first starting material is selected from the group consisting of phthalonitrile, o-cyanobenzamide, phthalanhydride, phthalimide, diiminoisoindol, and mixtures thereof, and the second starting material is selected from the group consisting of gallium chloride, titanium butoxide, and mixtures thereof, transferring the solution to an electrochemical cell having two or more electrodes, applying a voltage bias across the two or more electrodes, and heating the solution to form a pigment.

Yet another embodiment provides a process for making a photosensitive pigment, comprising dissolving a compound in a solvent to form a solution, transferring the solution to an electrochemical cell having two or more electrodes, and applying a voltage bias across the two or more electrodes, and heating the solution to form a pigment.

BRIEF DESCRIPTION OF THE DRAWINGS

For a better understanding of the present embodiments, reference may be had to the accompanying figures.

DETAILED DESCRIPTION

Figure 1:
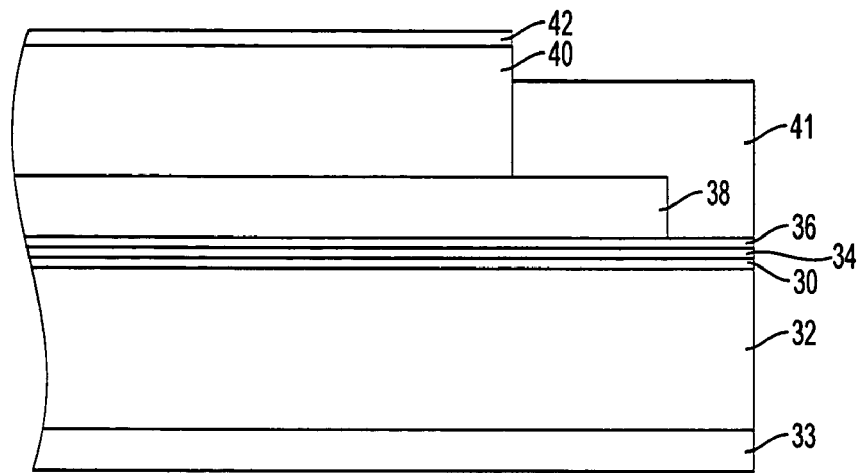
FIG. 1 is a cross-sectional view of a multilayered electrophotographic imaging member according to an embodiment of the present disclosure.

It is understood that other embodiments may be utilized and structural and operational changes may be made without departure from the scope of the embodiments disclosed herein.

The embodiments relate to an imaging member or photoreceptor that incorporates organic photosensitive pigments, for example, a phthalocyanine compound into the formulation of a charge generating layer, which has good charge generation and transport properties. In specific embodiments, the phthalocyanine compound is titanyl phthalocyanine (TiOPC). The TiOPC is produced by a partially electrochemical or purely electrochemical process which is discovered to require lower reaction temperature while providing better control in producing the desired TiOPC properties, such as for example, particle size, size distribution, particle shape, and the like.

According to embodiments herein, an electrophotographic imaging member is provided, which generally comprises at least a substrate layer, an imaging layer disposed on the substrate, and an optional overcoat layer disposed on the imaging layer. The imaging member includes, as imaging layers, a charge transport layer and a charge generating layer. The imaging member can be employed in the imaging process of electrophotography, where the surface of an electrophotographic plate, drum, belt or the like (imaging member or photoreceptor) containing a photoconductive insulating layer on a conductive layer is first uniformly electrostatically charged. The imaging member is then exposed to a pattern of activating electromagnetic radiation, such as light. The radiation selectively dissipates the charge on the illuminated areas of the photoconductive insulating layer while leaving behind an electrostatic latent image. This electrostatic latent image may then be developed to form a visible image by depositing oppositely charged particles on the surface of the photoconductive insulating layer. The resulting visible image may then be transferred from the imaging member directly or indirectly (such as by a transfer or other member) to a print substrate, such as transparency or paper. The imaging process may be repeated many times with reusable imaging members.

In a typical electrostatographic reproducing apparatus such as electrophotographic imaging system using a photoreceptor, a light image of an original to be copied is recorded in the form of an electrostatic latent image upon an imaging member and the latent image is subsequently rendered visible by the application of a developer mixture. The developer, having toner particles contained therein, is brought into contact with the electrostatic latent image to develop the image on an electrostatographic imaging member which has a charge-retentive surface. The developed toner image can then be transferred to a copy substrate, such as paper, that receives the image via a transfer member.

Alternatively, the developed image can be transferred to another intermediate transfer device, such as a belt or a drum, via the transfer member. The image can then be transferred to the paper by another transfer member. The toner particles may be transfixed or fused by heat and/or pressure to the paper. The final receiving medium is not limited to paper. It can be various substrates such as cloth, conducting or non-conducting sheets of polymer or metals. It can be in various forms, sheets or curved surfaces. After the toner has been transferred to the imaging member, it can then be transfixed by high pressure rollers or fusing component under heat and/or pressure.

An embodiment of an imaging member is illustrated in FIG. 1. The substrate 32 has an optional electrical conductive layer 30. An optional undercoat layer 34 can also be applied over the conductive layer, as well as an optional adhesive layer 36 over the undercoat layer 34. The charge generating layer 38 is illustrated between an adhesive layer 36 and a charge transport layer 40. An optional ground strip layer 41 operatively connects the charge generating layer 38 and the charge transport layer 40 to the conductive layer 30. An anticurl back coating layer 33 may be applied to the side of the substrate 32 opposite from the electrically active layers to render desired imaging member flatness. Other layers of the imaging member may also include, for example, an optional overcoat layer 42 directly over the charge transport layer 40 to provide protection against abrasion and wear.

The conductive ground plane 30 over the substrate 32 is typically a thin, metallic layer, for example a 10 nanometer thick titanium coating, which may be deposited over the substrate by vacuum deposition or sputtering processes. The layers 34, 36, 38, 40 and 42 may be separately and sequentially deposited onto the surface of the conductive ground plane 30 of substrate 32 as wet coating layers of solutions comprising one or more solvents, with each layer being completely dried before deposition of the subsequent coating layer. The anticurl back coating layer 33 may also be solution coated, but is applied to the back side of substrate 32, to balance the curl and render imaging member flashes.

Illustrated herein are embodiments of an imaging member comprising a substrate, a charge generating layer disposed on the substrate, and at least one charge transport layer disposed on the charge generating layer. The charge generating layer comprises a phthalocyanine pigment. In embodiments, the phthalocyanine pigment is titanyl phthalocyanine. Other known phthalocyanine pigments that can be used include hydroxygallium phthalocyanine, chlorogallium phthalocyanine, and methoxygallium phthalocyanine. The phthalocyanine pigments of the charge generating layer may be of a single phthalocyanine pigment or may include multiple different phthalocyanine pigments.

Illustrative examples of substrate layers selected for the imaging members may be opaque or substantially transparent, and may comprise any suitable material having the requisite mechanical properties. Thus, the substrate may comprise a layer of insulating material including inorganic or organic polymeric materials, such as MYLAR a commercially available polymer, MYLAR-containing titanium, a layer of an organic or inorganic material having a semiconductive surface layer, such as indium tin oxide, or aluminum arranged thereon, or a conductive material inclusive of aluminum, aluminized polyethylene terephthalate, titanized polyethylene chromium, nickel, brass or the like. The substrate may be flexible, seamless, or rigid, and may have a number of many different configurations, such as for example a plate, a cylindrical drum, a scroll, an endless flexible belt, and the like. In one embodiment, the substrate is in the form of a seamless flexible belt. The anticurl back coating is applied to the back of the substrate.

The thickness of the substrate layer depends on many factors, including economical considerations, thus this layer may be of substantial thickness, for example over 3,000 microns, or of minimum thickness providing there are no significant adverse effects on the member. In embodiments, the thickness of this layer is from about 75 microns to about 300 microns.

Moreover, the substrate may contain thereover an undercoat layer in some embodiments, including known undercoat layers, such as suitable phenolic resins, phenolic compounds, mixtures of phenolic resins and phenolic compounds, titanium oxide, silicon oxide mixtures like $TiO_2/SiO_2$.

In embodiments, the undercoat layer may also contain a binder component. Examples of the binder component include, but are not limited to, polyamides, vinyl chlorides, vinyl acetates, phenolic resins, polyurethanes, aminoplasts, melamine resins, benzoguanamine resins, polyimides, polyethylenes, polypropylenes, polycarbonates, polystyrenes, acrylics, styrene acrylic copolymers, methacrylics, vinylidene chlorides, polyvinyl acetals, epoxys, silicones, vinyl chloride-vinyl acetate copolymers, polyvinyl alcohols, polyesters, polyvinyl butyrals, nitrocelluloses, ethyl celluloses, caseins, gelatins, polyglutamic acids, starches, starch acetates, amino starches, polyacrylic acids, polyacrylamides, zirconium chelate compounds, titanyl chelate compounds, titanyl alkoxide compounds, organic titanyl compounds, silane coupling agents, and combinations thereof. In embodiments, the binder component comprises a member selected from the group consisting of phenolic-formaldehyde resin, melamine-formaldehyde resin, urea-formaldehyde resin, benzoguanamine-formaldehyde resin, glycoluril-formaldehyde resin, acrylic resin, styrene acrylic copolymer, and mixtures thereof.

In embodiments, the undercoat layer may contain an optional light scattering particle. In various embodiments, the light scattering particle has a refractive index different from the binder and has a number average particle size greater than about 0.8 μm. In various embodiments, the light scattering particle is amorphous silica P-100 commercially available from Espirit Chemical Co. In various embodiments, the light scattering particle is present in an amount of about 0 percent to about 10 percent by weight of a total weight of the undercoat layer.

In embodiments, the undercoat layer may contain various colorants. In various embodiments, the undercoat layer may contain organic pigments and organic dyes, including, but not limited to, azo pigments, quinoline pigments, perylene pigments, indigo pigments, thioindigo pigments, bisbenzimidazole pigments, phthalocyanine pigments, quinacridone pigments, quinoline pigments, lake pigments, azo lake pigments, anthraquinone pigments, oxazine pigments, dioxazine pigments, triphenylmethane pigments, azulenium dyes, squalium dyes, pyrylium dyes, triallylmethane dyes, xanthene dyes, thiazine dyes, and cyanine dyes. In various embodiments, the undercoat layer may include inorganic materials, such as amorphous silicon, amorphous selenium, tellurium, a selenium-tellurium alloy, cadmium sulfide, antimony sulfide, titanium oxide, tin oxide, zinc oxide, and zinc sulfide, and combinations thereof.

In embodiments, the thickness of the undercoat layer may be from about 0.1 μm to 30 μm.

A photoconductive imaging member herein can comprise in embodiments in sequence of a supporting substrate, an undercoat layer, an adhesive layer, a charge generating layer and a charge transport layer. For example, the adhesive layer can comprise a polyester with, for example, an $M_w$ of about 70,000, and an $M_n$ of about 35,000.

In embodiments, a photoconductive imaging member further includes an adhesive layer of a polyester with an $M_w$ of about 75,000, and an $M_n$ of about 40,000.

In embodiments, the charge generating layer (CGL) comprises a phthalocyanine pigment. In further embodiments, the phthalocyanine pigment is titanyl phthalocyanine. Although the phthalocyanine pigment is effective as the only pigment in the CGL, the phthalocyanine pigment may be used alone or in combination with another pigment, such as metal phthalocyanines, metal free phthalocyanines, perylenes, hydroxygallium phthalocyanines, chlorogallium phthalocyanines, methoxygallium phthalocyanines, vanadyl phthalocyanines, selenium, selenium alloys, trigonal selenium, and the like, and mixtures thereof.

In general embodiments, the phthalocyanine pigment is synthesized through an electrochemical process, which can improve the control of the pigment produced (e.g., particle size, size distribution, particle shape, and the like) but requires a lower reaction temperature for the synthesis than conventional methods of thermal synthesis. This electrochemical process for making a photosensitive pigment involves dissolving one or more starting materials of a compound, such as phthalocyanine, in a solvent to form a solution. The solvent can be, but not limited to, N-methylpyrrolidone, ethylene glycol, or any mixture thereof. In embodiments, the starting materials include at least a derivative of a phthalic acid, such as for example, phthalonitrile, o-cyanobenzamide, phthalanhydride, phthalimide, diiminoisoindol or any mixture thereof. In addition, a second starting material includes a derivative of metal, such as gallium chloride or titanium butoxide. Other starting materials may also include any one of a derivative of metal salt or a derivative of organometallic compounds, or any mixture thereof. The solution is subsequently transferred to an electrochemical cell having two or more electrodes, and optionally a heating jacket, where a voltage bias is applied across the electrodes to form the pigment. The voltage bias can be from about 10V to about 2,000V, or from about 10V to about 100V. The formed pigment is then filtered from the solution and washed. The pigment can be dried under vacuum. In some embodiments, the process may also include heating the solution to further the pigment formation. For example, the solution may be heated from about 30° C. to about 180° C.

In further embodiments, the process comprises dissolving a first starting material of phthalocyanine and a second starting material of phthalocyanine in a solvent to form a solution. The first starting material can be a derivative of a phthalic acid, such as for example, phthalonitrile, o-cyanobenzamide, phthalanhydride, phthalimide, diiminoisoindol or any mixture thereof. The second starting material can be any one of a derivative of metal, a derivative of metal salt, or a derivative of organometallic compounds, such as for example, gallium chloride, titanium butoxide, or any mixture thereof. The solution is then transferred to an electrochemical cell having two or more electrodes where a voltage bias is applied across the electrodes to form the phthalocyanine pigment. In one embodiment, the first starting material is diiminoisoindole and the second starting material is titanium butoxide.

In a specific embodiment, where the phthalocyanine pigment is titanyl phthalocyanine, the synthesis through the electrochemical process involves dissolving $Ti(C_4H_9O)_4$ in a solvent and transferring the resulting solution to an electrolytic reaction cell. The cell is equipped with two gold-plated electrodes and a heating jacket. In addition to thermal heating with the jacket, voltages of from about 10V to about 100V are applied to the solution. Solvents that may be used with the process include, but are not limited to, N-methylpyrrolidone (NMP) and ethylene glycol. The solvents selected can be those generally known as being solvents used in synthesis and also should be at least slightly conductive. A solvent system that can sustain a large electrical current is beneficial to the electrolytic process being used. In the this embodiment, the reaction temperature required for synthesis to occur is only about 100° C., with a product yield comparable to that of conventional thermal processes which require much higher reaction temperatures, such as for example, 195° C.

In another embodiment, the synthesis process is purely electrochemical and no thermal heating is used. In this embodiment, voltages of from about 10V to about 2,000V are applied to the solvent. In such embodiments, the reaction temperature needed for synthesis may be even further lowered to room temperature or a generally low temperature, for example, 50° C.

The pigment used for the charge generating layer, for example, titanyl phthalocyanine may be mixed with a binder. Photogenerating pigments can be selected for the charge generating layer in embodiments for example of an amount of from about 10 percent by weight to about 95 percent by weight dispersed in a binder. The pigment and binder may be mixed in a desired pigment: binder ratio, for example, about 60:40. Other ratios that can be used include anywhere in between 10:90 to 90:10 pigment to binder by weight. The solid content of the mixture may be about 12 percent but may also be anywhere from about 4 percent to about 12 percent. The binder may be a binder resin, such as any inactive resin material including those described, for example, in U.S. Pat. No. 3,121,006, the entire disclosure thereof being incorporated herein by reference. Typical organic resinous binders include thermoplastic and thermosetting resins such as one or more of polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl butyral, polyvinyl acetate, polysiloxanes, polyacrylates, polyvinyl acetals, polysamides, polyimides, amino resins, phenylene oxide resins, terephthalic acid resins, epoxy resins, phenolic reins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride/vinylchloride copolymers, vinylacetate/vinylacetate/vinylidene chloride copolymers, styrene-alkyd resins, and the like. An exemplary binder is a vinylchloride/vinyl acetate copolymer.

The pigment may be mixed with the binder in a solvent. It is desirable to select a coating solvent that does not substantially disturb or adversely affect the other previously coated layers of the device, such as ketones, alcohols, aromatic hydrocarbons, halogenated aliphatic hydrocarbons, ethers, amines, amides, esters, and the like. Specific examples are cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethyl formamide, dimethyl acetamide, butyl acetate, ethyl acetate, methoxyethyl acetate, and the like. An exemplary solvent is n-butyl acetate.

In further embodiments, the dried pigment is used in a conversion step. For example, the titanyl phthalocyanine may be mixed with dimethylformamide or another suitable conversion agent. This mixture may be rolled for a desired amount of time, for example, 5 days at 60 rpm bottle speed. The pigment may then be collected and washed, for example with acetone. The washed pigment may then be dried overnight, for example, in a vacuum. The dried, washed pigment may then be milled, for example with 1-mm diameter glass beads.

Generally, the thickness of the charge generating layer depends on a number of factors, including the thicknesses of the other layers and the amount of photogenerator material or pigment contained in the charge generating layers. Accordingly, this layer can be of a thickness of, for example, from about 0.05 micron to about 5 microns, or from about 0.25 micron to about 2 microns when, for example, the pigments are present in an amount of from about 30 to about 75 percent by volume. The maximum thickness of this layer in embodiments is dependent primarily upon factors, such as photosensitivity, electrical properties and mechanical considerations. The charge generating layer binder resin present in various suitable amounts, for example from about 1 to about 50 or from about 1 to about 10 weight percent, may be selected from a number of known polymers, such as poly(vinyl butyral), poly(vinyl carbazole), polyesters, polycarbonates, poly(vinyl chloride), polyacrylates and methacrylates, copolymers of vinyl chloride and vinyl acetate, phenoxy resins, polyurethanes, poly(vinyl alcohol), polyacrylonitrile, polystyrene, and the like.

In embodiments, the charge transport layer includes a charge transport component and a binder. The charge transport layer may be between about 10 µm and about 50 µm in thickness. Examples of the binder materials selected for the charge transport layers include components, such as those described in U.S. Pat. No. 3,121,006, the disclosure of which is totally incorporated herein by reference. Specific examples of polymer binder materials include polycarbonates, polyarylates, acrylate polymers, vinyl polymers, cellulose polymers, polyesters, polysiloxanes, polyamides, polyurethanes, poly (cyclo olefins), and epoxies, and random or alternating copolymers thereof. In embodiments electrically inactive binders are comprised of polycarbonate resins with for example a molecular weight of from about 20,000 to about 100,000 and more specifically with a molecular weight $M_w$ of from about 50,000 to about 100,000. Examples of polycarbonates are poly(4,4'-isopropylidene-diphenylene)carbonate (also referred to as bisphenol-A-polycarbonate, poly(4,4'-cyclohexylidinediphenylene)carbonate (referred to as bisphenol-Z polycarbonate), poly(4,4'-isopropylidene-3,3'-dimethyl-diphenyl)carbonate (also referred to as bisphenol-C-polycarbonate) and the like. In embodiments, the charge transport layer, such as a hole transport layer, may have a thickness from about 10 to about 55 microns. In embodiments, electrically inactive binders are selected comprised of polycarbonate resins having a molecular weight of from about 20,000 to about 100,000 or from about 50,000 to about 100,000. Generally, the transport layer contains from about 10 to about 75 percent by weight of the charge transport material or from about 35 percent to about 50 percent of this material.

In embodiments, the at least one charge transport layer comprises from about 1 to about 7 layers. For example, in embodiments, the at least one charge transport layer comprises a top charge transport layer and a bottom charge transport layer, wherein the bottom layer is situated between the charge generating layer and the top layer.

The charge transport layers can comprise in embodiments aryl amine molecules, and other known charge components. For example, a photoconductive imaging member disclosed herein may have charge transport aryl amines of the following formula:

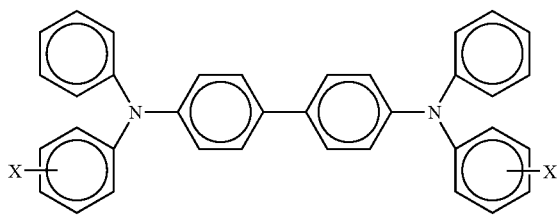

wherein x is alkyl, and wherein the aryl amine is dispersed in a resinous binder. In another embodiment, imaging member may have an aryl amine alkyl that is methyl, a halogen that is chloride, and a resinous binder selected from the group consisting of polycarbonates and polystyrene. In yet another embodiment, the photoconductive imaging member has an aryl amine that is N,N'-diphenyl-N,N-bis(3-methylphenyl)-1,1'-biphenyl-4,4'-diamine.

The charge transport aryl amines can also be of the following formula:

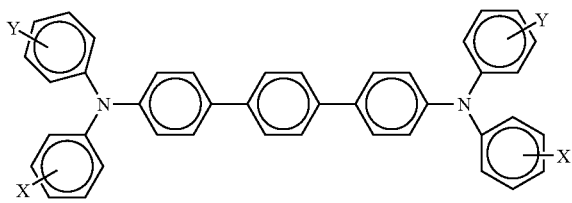

wherein X and Y are independently alkyl, alkoxy, aryl, a halogen, or mixtures thereof. Alkyl and alkoxy can contain for example from 1 to about 25 carbon atoms, and more specifically from 1 to about 12 carbon atoms, such as methyl, ethyl, propyl, butyl, pentyl, and the corresponding alkoxides. Aryl can contain from 6 to about 36 carbon atoms, such as phenyl, and the like. Halogen includes chloride, bromide, iodide and fluoride. Substituted alkyls, alkoxys, and aryls can also be selected in embodiments.

Examples of specific aryl amines include N,N'-diphenyl-N,N'-bis(alkylphenyl)-1,1-biphenyl-4,4'-diamine wherein alkyl is selected from the group consisting of methyl, ethyl, propyl, butyl, hexyl, and the like; N,N'-diphenyl-N,N'-bis(halophenyl)-1,1'-biphenyl-4,4'-diamine wherein the halo substituent is a chloro substituent; N,N'-bis(4-butylphenyl)-N,N'-di-p-tolyl-[p-terphenyl]-4,4"-diamine, N,N'-bis(4-butylphenyl)-N,N'-di-m-tolyl-[p-terphenyl]-4,4"-diamine, N,N'-bis(4-butylphenyl)-N,N'-di-o-tolyl-[p-terphenyl]-4,4"-diamine, N,N'-bis(4-butylphenyl)-N,N'-bis-(4-isopropylphenyl)-[p-terphenyl]-4,4"-diamine, N,N'-bis(4-butylphenyl)-N,N'-bis-(2-ethyl-6-methylphenyl)-[p-terphenyl]-4,4"-diamine, N,N'-bis(4-butylphenyl)-N,N'-bis-(2,5-dimethylphenyl)-[p-terphenyl]-4,4"-diamine, N,N'-diphenyl-N,N'-bis(3-chlorophenyl)-[p-terphenyl]-4,4"-diamine and the like and optionally mixtures thereof. Other known charge transport layer molecules can be selected, reference for example, U.S. Pat. Nos. 4,921,773 and 4,464,450, the disclosures of which are totally incorporated herein by reference. In embodiments, the charge transport layer may comprise aryl amine mixtures.

An adhesive layer may optionally be applied such as to the undercoat layer. The adhesive layer may comprise any suitable material, for example, any suitable film forming polymer. Typical adhesive layer materials include for example, but are not limited to, copolyester resins, polyarylates, polyurethanes, blends of resins, and the like. Any suitable solvent may be selected in embodiments to form an adhesive layer coating solution. Typical solvents include, but are not limited to, for example, tetrahydrofuran, toluene, hexane, cyclohexane, cyclohexanone, methylene chloride, 1,1,2-trichloroethane, monochlorobenzene, and mixtures thereof, and the like.

In embodiments, the at least one charge transport layer comprises an antioxidant optionally comprised of, for example, a hindered phenol or a hindered amine.

Also, included herein are methods of imaging and printing with the photoresponsive devices illustrated herein. These methods generally involve the formation of an electrostatic latent image on the imaging member, followed by developing the image with a toner composition comprised, for example, of thermoplastic resin, colorant, such as pigment, charge additive, and surface additives, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

Figure 2:
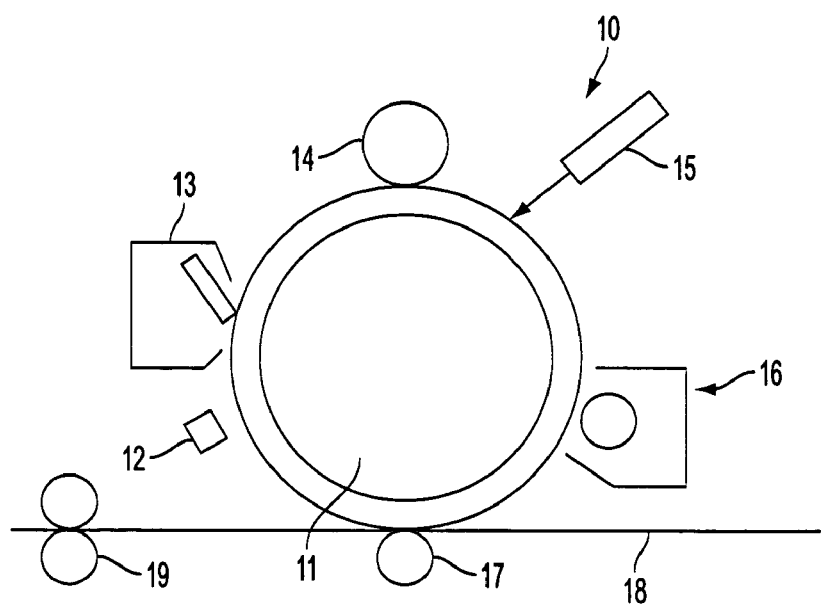
FIG. 2 is a schematic nonstructural view showing an embodiment of the electrophotographic image forming apparatus of the present disclosure.

FIG. 2 shows a schematic constitution of an embodiment of an image forming apparatus 10. The image forming apparatus 10 is equipped with an imaging member 11, such as a cylindrical photoreceptor drum, having a charge retentive surface to receive an electrostatic latent image thereon. Around the imaging member 11 may be disposed a static eliminating light source 12 for eliminating residual electrostatic charges on the imaging member 11, an optional cleaning blade 13 for removing the toner remained on the imaging member 11, a charging component 14, such as a charger roll, for charging the imaging member 11, a light-exposure laser optical system 15 for exposing the imaging member 11 based on an image signal, a development component 16 to apply developer material to the charge-retentive surface to create a developed image in the imaging member 11, and a transfer component 17, such as a transfer roll, to transferring a toner image from the imaging member 11 onto a copy substrate 18, such as paper, in this order. Also, the image forming apparatus 10 is equipped with a fusing component 19, such as a fuser/fixing roll, to fuse the toner image transferred onto the copy substrate 18 from the transfer component 17.

The light exposure laser optical system 15 is equipped with a laser diode (for example, oscillation wavelength 780 nm) for irradiating a laser light based on an image signal subjected to a digital treatment, a polygon mirror polarizing the irradiated laser light, and a lens system of moving the laser light at a uniform velocity with a definite size.

Various exemplary embodiments encompassed herein include a method of imaging which includes generating an electrostatic latent image on an imaging member, developing a latent image, and transferring the developed electrostatic image to a suitable substrate.

In a selected embodiment, an image forming apparatus for forming images on a recording medium comprising: a) an imaging member having a charge retentive-surface for receiving an electrostatic latent image thereon, wherein the imaging member comprises a substrate, a charge generating layer disposed on the substrate, and at least one charge transport layer disposed on the charge generating layer; b) a development component for applying a developer material to the charge-retentive surface to develop the electrostatic latent image to form a developed image on the charge-retentive surface; c) a transfer component for transferring the developed image from the charge-retentive surface to a copy substrate; and d) a fusing component for fusing the developed image to the copy substrate.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example I

Two solvent systems were used—one based on N-methylpyrrolidone (NMP) and one based on ethylene glycol.

Figure 3:
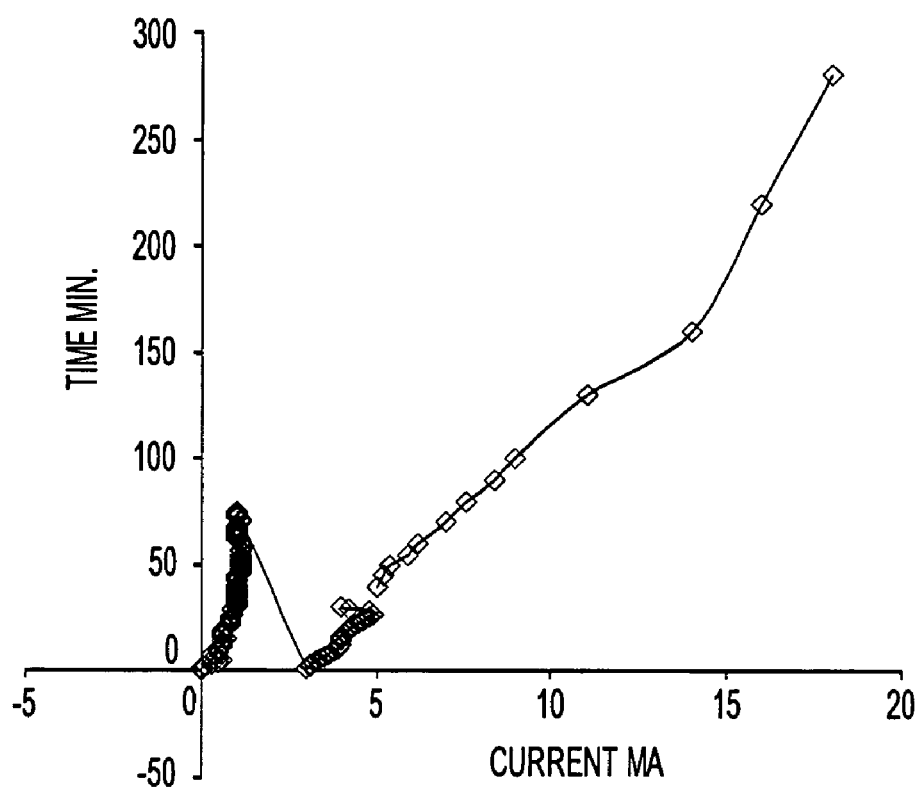
FIG. 3 is a graph of the reaction time versus current curve of an embodiment of the present disclosure.

The preparation started with mixing 17.2 g of diiminoisoindoline ($DI^3$) and about 10 g of $Ti(C_4H_9O)_4$ in about 100 g of NMP and ethylene glycol at about 50° C. After dissolution, the clear and dark yellow solution was transferred to an electrolytic reaction cell equipped with two gold plated electrodes and a heating jacket. The reaction was started by applying a 20V bias across the electrodes and gradually increased the temperature from about 24° C. to about 100° C. for a period of several hours, where the solution remained clear dark yellow, suggesting no pigment formation. FIG. 3 shows the reaction time versus current of this synthesis reaction. The graph represents two reactions—the first curve involves a 20V bias and the second curve involves a 100V bias.

Figure 4:
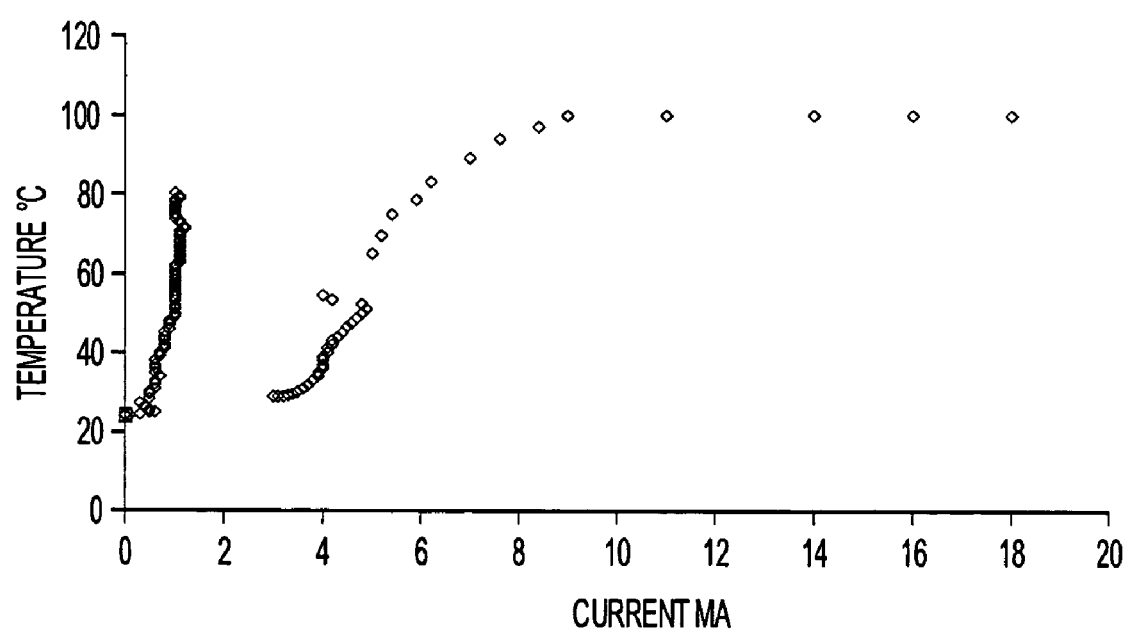
FIG. 4 is a graph of the reaction temperature versus current curve of another embodiment of the present disclosure.

After resting overnight, the reaction was continued by setting the bias at 100V and similarly increased the temperature gradually from room temperature to about 100° C. where the solution color turned from dark yellow to dark orange to dark purple beginning at about 80° C., a strong indication of pigment formation. Both solvents gave similar results but the NMP solution had a higher current response with up to 20 mA at about 100° C. FIG. 4 shows the reaction temperature versus current of this synthesis reaction. Again, the graph represents two reactions—the first curve involves a 20V bias and the second curve involves a 100V bias. The pigment slurries were subsequently filtered, washed with methanol several times, and dried under vacuum at about 60° C. overnight.

Comparative Example

Separately, a regular synthesis process was also executed in chloronaphthalene by refluxing at about 195° C. for 3 hours and the pigment was collected in the same manner as described above. Another regular thermal synthesis preparation started with mixing 20 g of diiminoisoindoline (DI3) and about 13 g of Ti(C4H9O)4 in about 10 g of NMP at about 50° C., and after dissolution the clear and dark yellow solution was put in an oil bath of just 85-95° C. and heated for over six hours. The solution changed from dark yellow to light purple in about 30 minutes of reaction but the color maintained the same throughout the synthesis. The solution was filtered and a trace amount of pigment was collected. After vacuum drying the amount of pigment was weighed to be about 340 mg—yield is about 1.5 percent. In contrast, the yield is 70-80 percent at about 195° C. and the electrochemically assisted synthesis resulted in about 70 percent yield at about 85° C. The reaction schematics for the comparative example (I) and the two inventive examples using NMP (II) and ethylene glycol (III) are shown below:

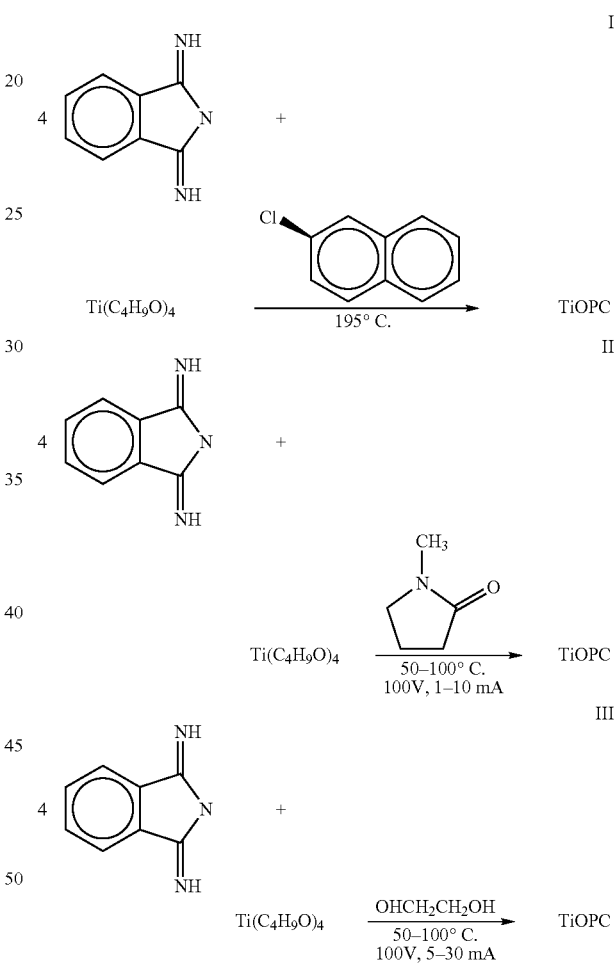

Results

The rough yields for the electrochemically assisted syntheses were about 70 percent and 67 percent for the NMP and ethylene glycol solvents, respectively, and the yield for the regular synthesis at about 195° C. was about 76 percent, but only 1.5 percent at 85-95° C.

The results suggest that the electrochemical process improved the pigment preparation by lowering the reaction temperature from about 195° C. to about 100° C. without sacrificing yield, whereas under such temperature, regular synthesis would give little to no yield. Microscopic analysis found that the electrochemically assisted process gives more needle-like pigments than that of regular synthesis but with similar particle size, suggesting that the pigment formation is still dictated by bulk processes.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A process for making a photosensitive pigment, comprising:
    dissolving one or more starting materials and a derivative of metal in a solvent to form a solution;
    transferring the solution to an electrochemical cell having two or more electrodes; and
    applying a voltage bias across the two or more electrodes to form a pigment;
    wherein the one or more starting materials is selected from the group consisting of phthalonitrile, o-cyanobenzamide, phthalanhydride, phthalimide, diiminoisoindole, and mixtures thereof; and
    wherein the derivative of metal is selected from the group consisting of gallium chloride, titanium butoxide, and mixtures thereof.

2. The process of claim 1 further including filtering the pigment from the solution.

3. The process of claim 2 further including washing the pigment.

4. The process of claim 3 further including drying the pigment under vacuum.

5. The process of claim 1, wherein the solvent is selected from the group consisting of N-methylpyrrolidone, ethylene glycol, and mixtures thereof.

6. The process of claim 1, wherein the applied voltage bias is from about 10V to about 2,000V.

7. The process of claim 6, wherein the applied voltage bias is from about 10V to about 100V.

8. The process of claim 1, wherein the electrochemical cell further includes a heating jacket.

9. The process of claim 1 further including heating the solution.

10. The process of claim 9, wherein the solution is heated to from about 30° C. to about 180° C.

11. The process of claim 1, wherein the starting material is diiminoisoindole and the derivative of metal is titanium butoxide.

12. A process for making a photosensitive pigment, comprising:
    dissolving a first starting material and a second starting material in a solvent to form a solution, wherein the first starting material is selected from the group consisting of phthalonitrile, o-cyanobenzamide, phthalanhydride, phthalimide, diiminoisoindole, and mixtures thereof, and the second starting material is selected from the group consisting of gallium chloride, titanium butoxide, and mixtures thereof;
    transferring the solution to an electrochemical cell having two or more electrodes;
    applying a voltage bias across the two or more electrodes; and
    heating the solution to form a pigment.

13. The process of claim 12, wherein the first starting material is diiminoisoindole and the second starting material is titanium butoxide.

14. The process of claim 12 further including filtering the pigment from the solution.

15. The process of claim 14 further including washing the pigment.

16. The process of claim 15 further including drying the pigment under vacuum.

17. The process of claim 12, wherein the solvent is selected from the group consisting of N-methylpyrrolidone, ethylene glycol, and mixtures thereof.

18. The process of claim 12, wherein the applied voltage bias is from about 10V to about 2,000V.

19. The process of claim 12, wherein the solution is heated from about 30° C. to about 180° C.

* * * * *